US005278988A

United States Patent [19]

Dejean et al.

[11] Patent Number: 5,278,988

[45] Date of Patent: Jan. 11, 1994

[54] AUTOMATED RECEIVER MONITORING METHOD AND APPARATUS

[75] Inventors: Jean P. Dejean, Cincinnati, Ohio; Enrico Massetti, Dunedin, Fla.; Ken Straub, Deerfield; Everett Zurlinden, Mundelein, both of Ill.

[73] Assignee: A. C. Nielsen Company, Northbrook, Ill.

[21] Appl. No.: 715,366

[22] Filed: Jun. 14, 1991

[51] Int. Cl.$^5$ ........................ H04B 17/00; H04H 9/00

[52] U.S. Cl. ........................ 455/2; 455/185.1

[58] Field of Search ........................ 455/185.1, 186.1, 2, 455/6.3, 67.1; 358/84

[56] References Cited

U.S. PATENT DOCUMENTS

| | | | |
|---|---|---|---|
| 2,833,859 | 5/1958 | Rahmel et al. . | |
| 3,973,206 | 8/1976 | Haselwood et al. . | |
| 4,048,562 | 9/1977 | Haselwood et al. . | |
| 4,425,578 | 1/1984 | Haselwood et al. . | |
| 4,723,302 | 2/1988 | Fulmer et al. . | |
| 4,764,808 | 8/1988 | Solar . | |
| 4,876,736 | 10/1989 | Kiewit . | |
| 4,907,273 | 3/1990 | Wiedemer | 358/84 |
| 4,930,011 | 5/1990 | Kiewit . | |
| 4,943,963 | 7/1990 | Waechter et al. . | |
| 4,972,503 | 11/1990 | Zurlinden . | |
| 5,086,511 | 3/1990 | Kobayashi et al. | 455/186.1 |
| 5,101,508 | 3/1992 | Owaki | 455/186.1 |

FOREIGN PATENT DOCUMENTS

| | | | |
|---|---|---|---|
| 3208760 | 9/1983 | Fed. Rep. of Germany | 455/185.1 |
| 2555383 | 5/1985 | France | 455/2 |
| 56-8938 | 1/1981 | Japan | 455/2 |
| 58-60817 | 4/1983 | Japan | 455/185.1 |
| WO90/00330 | 1/1990 | World Int. Prop. O. | 358/84 |
| 9108618 | 6/1991 | World Int. Prop. O. | 455/185.1 |

*Primary Examiner*—Jin F. Ng
*Assistant Examiner*—Lisa Charouel
*Attorney, Agent, or Firm*—Marshall, O'Toole, Gerstein, Murray & Borun

[57] ABSTRACT

A method and apparatus are provided for determining a particular transmitting station from which program signals are received and translated by a monitored receiver within a test area and including mobile receivers. A stored transmitter characteristic table includes a corresponding transmitting station identification stored with a predefined subarea of a plurality of predefined subareas within the test area for each predetermined tuned frequency of the monitored receiver. A tuned frequency of the monitored receiver is identified and the particular transmitting station corresponding to the identified tuned frequency is identified responsive to both the identified tuned frequency of the monitored receiver and the stored transmitter characteristic table. The identified transmitting station data is stored with time of occurrence data.

20 Claims, 3 Drawing Sheets

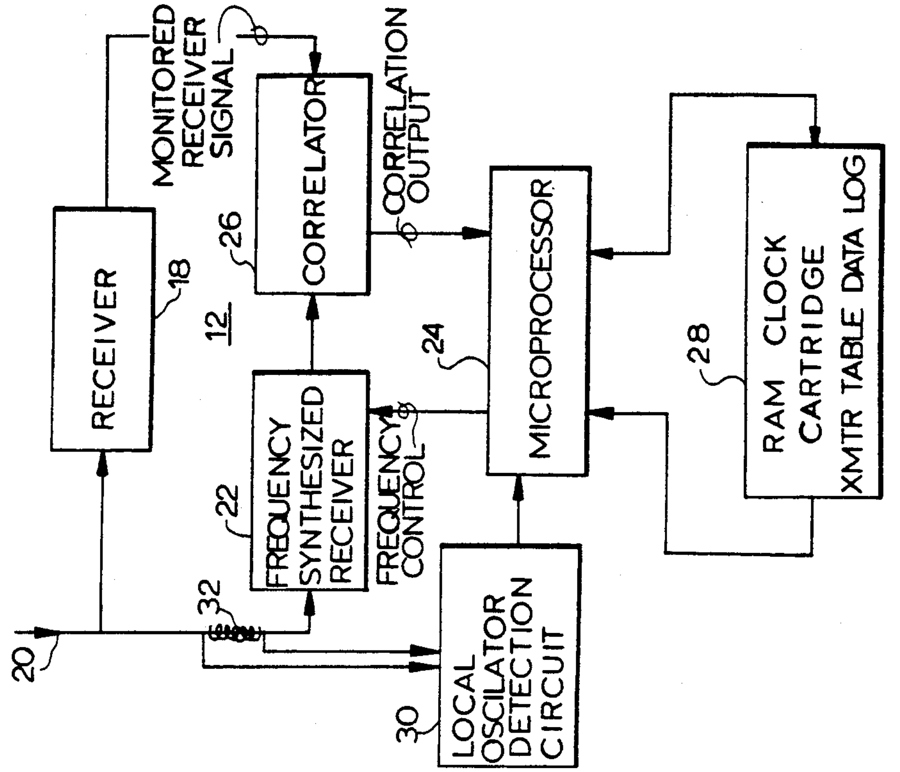
FIG.3
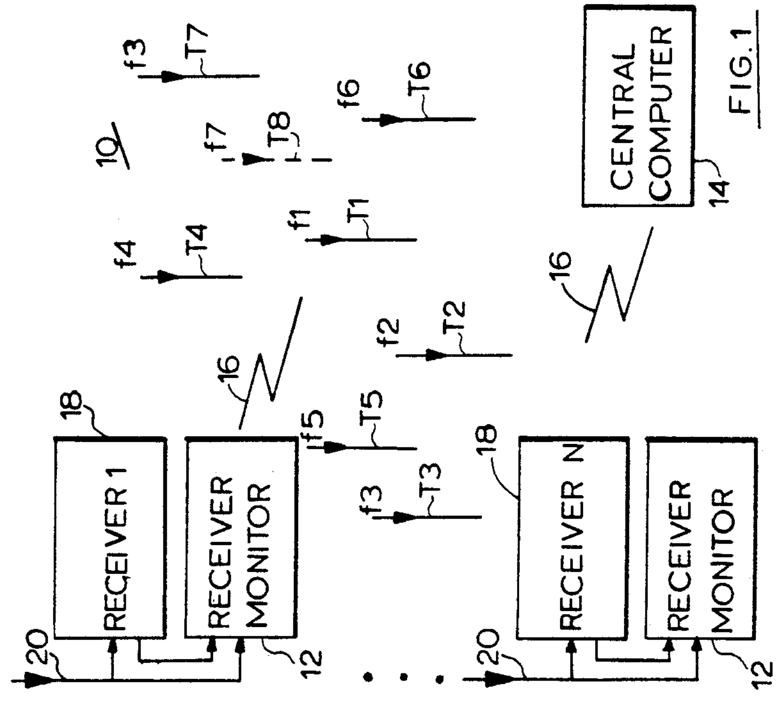
FIG.1
| SUBAREA | FREQUENCY | STATIONS |
|---|---|---|
| S1 | f4,f5 | T4,T5 |
| S2 | f2,f3,f5 | T2,T3,T5 |
| S3 | f3,f4 | T7,T4 |
| S4 | f1,f3,f6 | T1,T7,T6 |
FIG.2

AUTOMATED RECEIVER MONITORING METHOD AND APPARATUS

BACKGROUND OF THE INVENTION

1. Field of the Invention

The invention relates generally to a method and apparatus for monitoring receivers, and more particularly to methods and apparatus for determining the particular transmitting station from which program signals are received and translated by a monitored receiver and including automobile and portable receivers.

2. Description of the Prior Art

Various arrangements have been employed to determine the channel to which a radio and/or television receiver is tuned. Examples of receiver monitoring methods and apparatus for monitoring receivers are provided by U.S. Pat. Nos. 2,833,859; 3,973,206; 4,048,562, 4,425,578; 4,723,302; 4,764,808; 4,876,736; 4,930,011; 4,943,963; and 4,972,503. While these systems provide improvements over other known arrangements, a need exists for an economically effective system having flexibility to accommodate monitoring a large number of receivers including mobile receivers in a prompt and efficient manner.

SUMMARY OF THE INVENTION

Important objects of the present invention are to provide a method and apparatus for monitoring receivers that overcome many of the disadvantages of the prior art systems; to provide such method and apparatus for monitoring receivers that can be effectively and efficiently configured for monitoring mobile receivers; to provide a method and apparatus for determining a particular transmitting station from which program signals are received and translated by a monitored receiver within a test area that automates the identification of new transmitting stations.

In brief, the objects and advantages of the present invention are achieved by a method and apparatus for determining a particular transmitting station from which program signals are received and translated by a monitored receiver within a test area. A transmitter characteristic table is stored in the receiver monitor apparatus. The transmitter characteristic table includes a corresponding transmitting station identification stored with a predefined subarea of a plurality of predefined subareas within the test area for each predetermined tuned frequency of the monitored receiver. A tuned frequency of the monitored receiver is identified and the particular transmitting station corresponding to the identified tuned frequency is identified responsive to both the identified tuned frequency of the monitored receiver and the stored transmitter characteristic table. The identified transmitting station data is stored with time of occurrence data.

BRIEF DESCRIPTION OF THE DRAWING

The present invention together with the above and other objects and advantages may best be understood from the following detailed description of the embodiment of the invention illustrated in the drawings, wherein:

FIG. 1 is a block diagram of a receiver monitoring system according to the present invention;

FIG. 2 is a transmitter characteristic table illustrating transmitting stations with a corresponding transmitting frequency by predefined subareas of a geographical test area of the receiver monitoring system of FIG. 1 to perform the method of the present invention;

FIG. 3 is a block diagram illustrating a receiver monitoring apparatus of the receiver monitoring system of FIG. 1;

DETAILED DESCRIPTION OF THE PREFERRED EMBODIMENT

Figure 4:
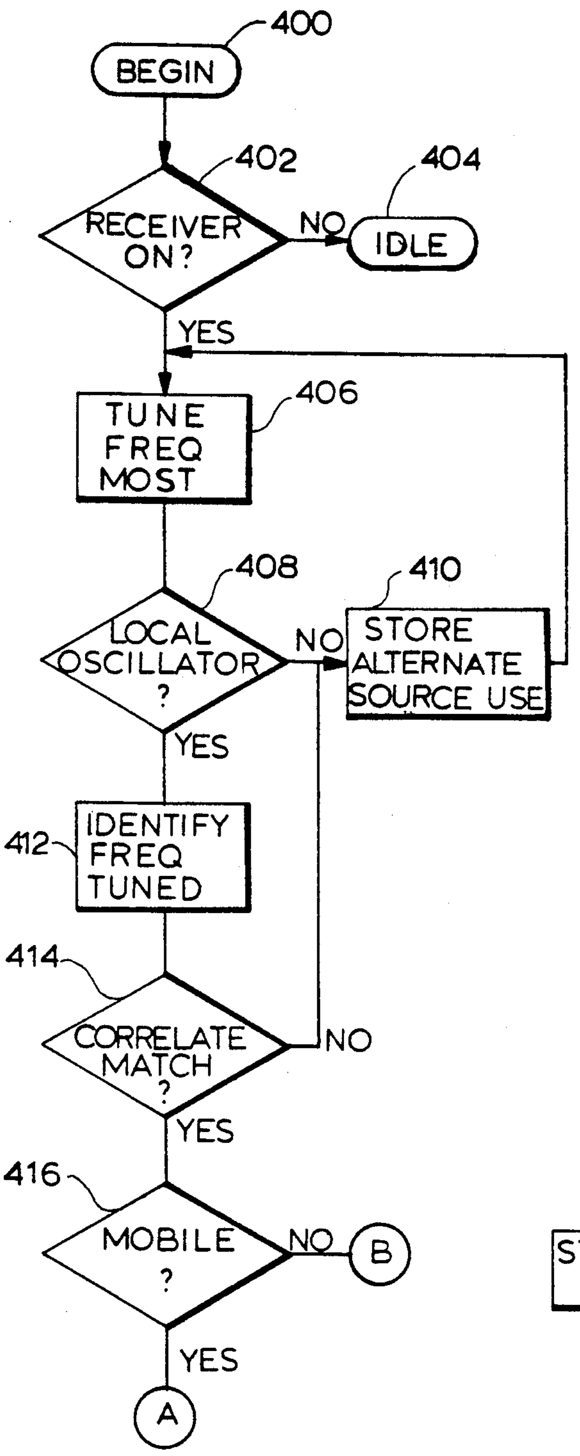
FIGS. 4–5 are flow charts illustrating logical steps performed by the receiver monitoring apparatus of the receiver monitoring system of FIG. 1 in accordance with methods of the present invention.

Referring now to the drawing, with particular attention to FIG. 1, there is illustrated a block diagram of a new and improved receiver monitoring system according to the invention generally designated by the reference numeral 10. While the receiver monitoring system 10 is depicted and generally described herein for monitoring a mobile radio receiver, the principles of the present invention are also applicable to monitoring television receivers, video cassette recorders and other receivers and television viewing and listening habits of individual audience members or panelists of cooperating households.

Receiver monitoring system 10 includes a plurality of receiver monitors 1–N generally designated by the reference character 12 coupled to a central computer 14 via communications links generally designated by the reference character 16. Each receiver monitor 12 monitors and stores selected, monitored receiver data, for example, such as tuned transmitting station and frequency data, tune-in and tune-out events together with time of occurrence data and identified new transmitters or broadcasting stations within a geographical or test area of the receiver monitor system 10. Receiver monitor 12 does not require access to any electrical signal that is only available internally to a monitored receiver 18. Central computer 14 collects and processes the monitored data from the receiver monitors 12 to provide market research analysis and reports. Central computer 14 utilizes the collected data to update and maintain transmitter characteristic data including additional identified broadcasting stations. Central computer 14 periodically resets the real time clocks of the receiver monitor 12 to facilitate accurately time stamping of the monitored receiver data.

FIG. 1 illustrates a plurality of broadcasting stations or transmitters T1–T8 in the test area of the receiver monitor system 10. An associated transmitting frequency is shown with each of the transmitters T1–T8. As shown, transmitter T1 has a transmitting frequency f1, transmitter T2 has a transmitting frequency f2, transmitter T3 has a transmitting frequency f3, transmitter T4 has a transmitting frequency f4, transmitter T5 has a transmitting frequency f5, transmitter T6 has a transmitting frequency f6, transmitter T7 has the transmitting frequency f3 and transmitter T8 has a transmitting frequency f7.

By dividing the test area into cells or subareas based upon transmitter signal strengths, broadcasting stations or transmitters having the same transmitting frequency, such as frequency f3 for both transmitters T3 and T7, can be distinguished and uniquely identified.

FIG. 2 is a transmitter characteristic table illustrating a cluster list of the transmitter stations T1–T8 by a plurality of predefined subareas S1–S4 within the test area of the receiver monitor system 10. Referring to FIGS. 1 and 2, geographic subareas S1–S4 are determined by a unique set of the transmitters T1–T8 that can be received within acceptable signal-to-noise ratios. For example, a receiver monitor 12 located within the subarea S1 can receive acceptable transmitted frequency signals f4, f5 from transmitter stations T4 and T5, while other transmitted frequency signals f3, f2, f6, f7 and f3 from transmitter stations T3, T2, T6, T8 and T7 have a signal-to-noise ratio below a predetermined threshold value. Similarly, a receiver monitor 12 located within the subarea S2 can receive acceptable transmitted frequency signals f2, f3 and f5 from transmitter stations T2, T3 and T5. Using such predefined subareas S1–S4, a receiver monitor 12 having identified a tuned frequency f3 of its monitored receiver, determines its subarea location by tuning another frequency signal within the subareas S2, S3 or S4, for example, by tuning transmitted frequency signal f4 and comparing the detected signal-to-noise ratio to a threshold value. When the detected signal-to-noise ratio is greater than the threshold value, then subarea S3 is identified. Otherwise, another frequency signal within either subarea S2 or S4 is tuned to identify one of the subareas S2 or S4 as the current location. When subarea S3 is identified, then the associated transmitter station is T7.

Referring to FIG. 3, there is shown a block diagram representation of the receiver monitor 12 together with a monitored receiver 18 that is coupled to a receiving antenna 20. Among its primary components, receiver monitor 12 includes a frequency synthesized receiver 22 having the same frequency bands (AM and FM) of the monitored receiver 18; a microprocessor 24 for controlling the frequency synthesized receiver 22 and identifying a tuned transmitter; a correlator 26 computes a crosscorrelation of output signals of the monitored receiver 18 and the frequency synthesized receiver 22 under the control of the microprocessor 24; and a non-volatile random access memory (RAM)/clock cartridge 28 for providing memory for storage of the transmitter characteristic table and monitored data and including a real time clock for providing time of occurrence or a time stamp of any change in channel or other desired monitored parameter. Frequency synthesized receiver 22 is connected to the receiving antenna 20 so that the same radio frequency (RF) signals are received by the receiver monitor 12 as the monitored receiver 18. Microprocessor 24 controls the frequency synthesized receiver frequency scan until a transmitting station is tuned.

An audio output signal of the monitored receiver 18 can be applied to the correlator 26 via either a direct connection or a microphone pick-up as indicated at a line labelled MONITORED RECEIVER SIGNAL. Frequency synthesized receiver 22 generates a standard audio output that is applied to the correlator 26. When the frequency synthesized receiver 22 and the monitored receiver 18 are tuned to the same frequency, the audio output signals applied to the correlator 26 are similar. A crosscorrelation output signal of the correlator 26 is applied to the microprocessor 24. Microprocessor 24 threshold compares the crosscorrelation output signal to determine whether or not the frequency synthesized receiver 22 and the monitored receiver 18 are tuned to the same frequency.

RAM/clock cartridge 28 includes a battery and advantageously functions as the communications link 16 for bidirectional communications with the central computer 14. The real time clock contained in the RAM/CLOCK cartridge 28 is periodically reset by the central computer 14 and the transmitter characteristic table is updated by the central computer 14 to include new broadcasting stations. A local oscillator detection circuit 30 receives a RF signal emitted by the monitored receiver 18 via a non-invasive, inductive probe 32. A detected local oscillator signal of the circuit 30 is applied to the microprocessor 24 to determine the tuned frequency of the monitored receiver 18.

It should be understood that various conventional arrangements can be used for the communication links 16, for example, such as, via telephone lines connected to the public switched telephone network or via mailable memory devices. Various commercially available microprocessor devices having standard capabilities can be used for the central computer 14, for example, such as a 80286 microprocessor manufactured and sold by Intel Corporation of Santa Clara, Calif.

Figure 5:
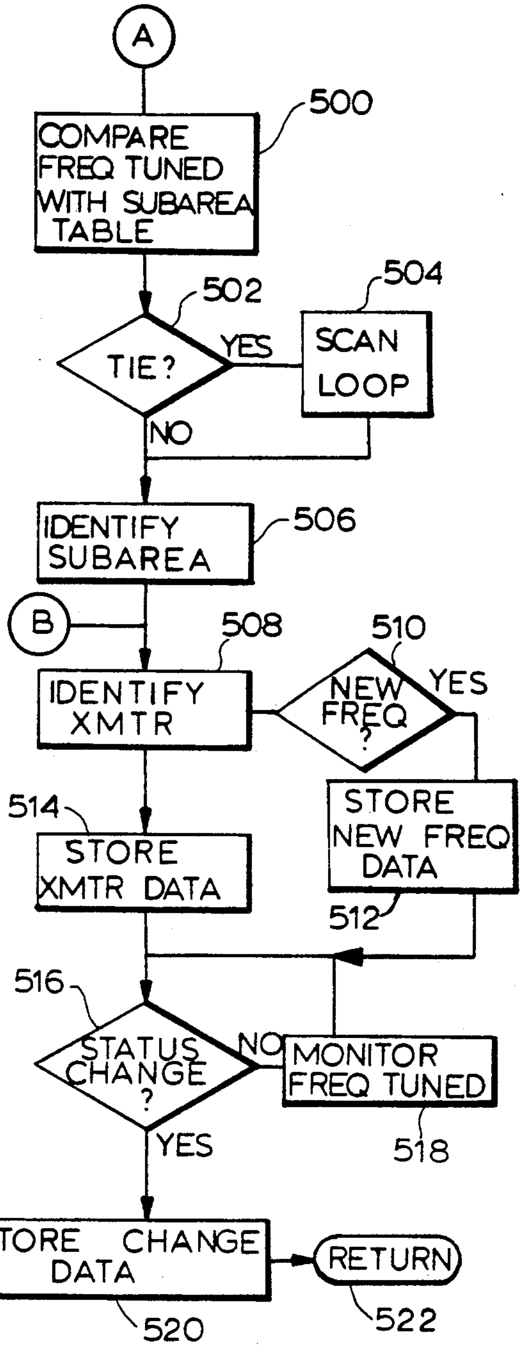

FIGS. 4–5 are flow charts illustrating logical steps performed by the microprocessor 24 in the operation of the receiver monitoring system 10. In FIG. 4, the sequential operations begin as indicated at a block 400. Microprocessor 24 monitors the receiver status as indicated at blocks 402 and 404. When the receiver is turned on, the scanning process begins with scanning first the most often tuned frequencies, or the last tuned frequency as indicated at a block 406. The presence of the local oscillator signal is identified as indicated at a block 408. When the absence of the local oscillator signal is identified at block 408, then an alternate signal source, such as a cassette use is stored as indicated at a block 410. Otherwise when the local oscillator signal is identified at block 408, the tuned frequency is identified as indicated at a block 412. A crosscorrelation match is determined as indicated at a block 414. A lack of crosscorrelation or no match indicates an alternate signal source, such as a cassette use is stored at block 410. A monitored mobile receiver 18 is identified at a decision block 416.

Referring to FIG. 5, when a monitored mobile receiver is identified at block 416 of FIG. 4, then the sequential operations continue following entry point A by comparing the identified tuned frequency with the transmitter characteristic table as indicated at a block 500. When a tie or more than one corresponding transmitting station is identified as indicated at a decision block 502, then a scan loop is performed to determine the particular subarea location of the monitored receiver 18 as indicated at a block 504. The particular subarea is identified as indicated at a block 506 and then the particular corresponding transmitter is identified as indicated at a block 508. For a fixed monitored receiver identified at block 416 of FIG. 4, then the sequential operations continue following entry point B, to identify the particular corresponding transmitter at block 508. When a corresponding transmitter is not identified at block 508, a new transmitted frequency is indicated at a decision block 510 such as transmitter T8, shown in dotted line in FIG. 1. The new transmitted frequency is stored with the monitored data in RAM/clock cartridge 28 as indicated at block 512. The identified particular corresponding transmitter data is stored as indicated at a block 514. A status change of the monitored receiver is determined as indicated at a decision block 516 and monitoring of the identified tuned frequency continues as indicated at a block 518 until a status change is identified. Then the change data is time-stamped and stored as indicated at block 520 and the sequential operations return as indicated at block 522 and the monitoring sequence is repeated.

Figure 6:
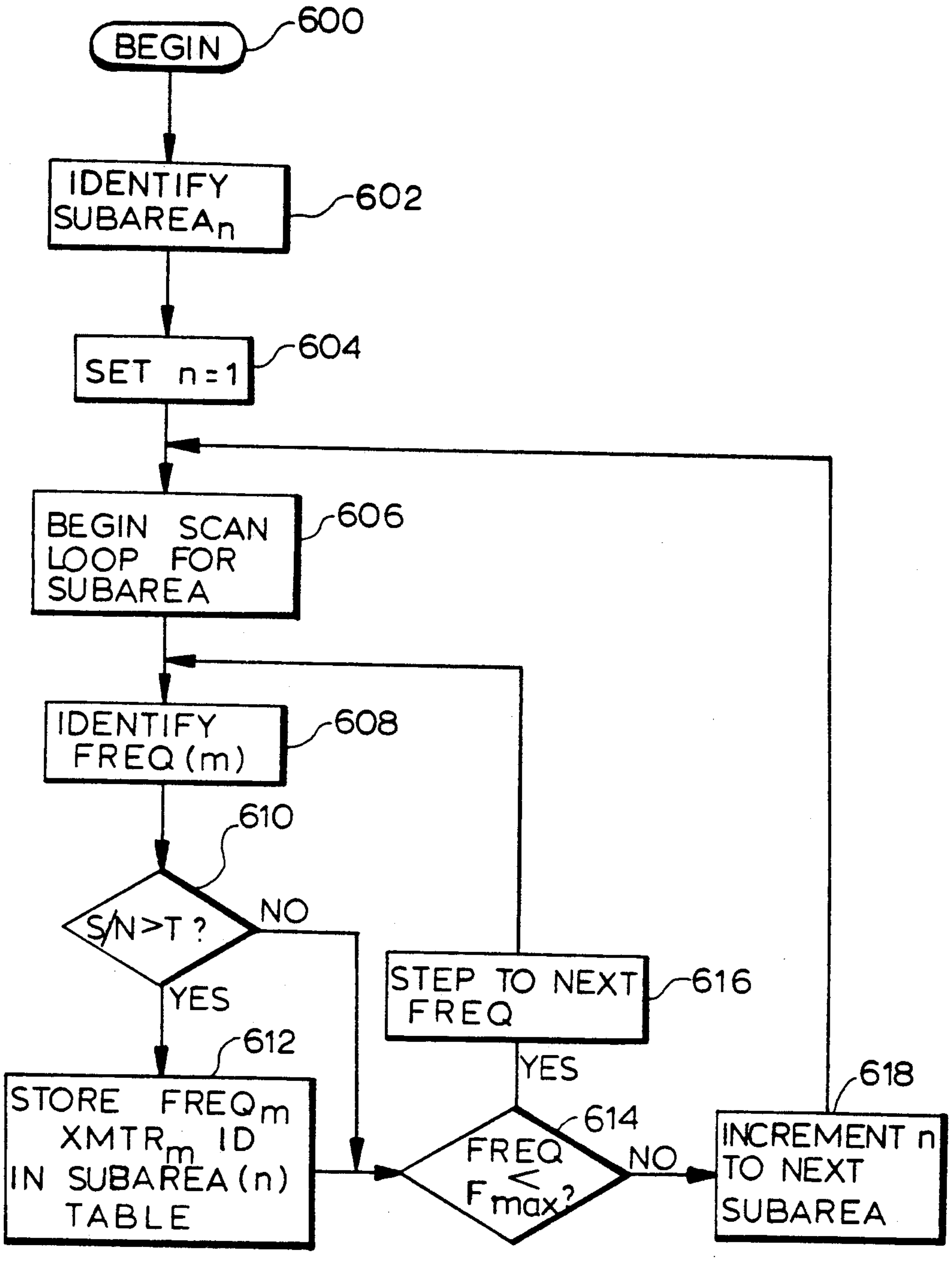
FIG. 6 is a flow chart illustrating logical steps performed by either a central computer or the receiver monitoring apparatus in generating the transmitter characteristic table of the receiver monitoring system of FIG. 1.

Referring to FIG. 6, sequential steps performed by the microprocessor 24 or the central computer 14 for defining and storing the transmitter characteristic table are illustrated. The sequential operations begin as indicated at a block 600. A first subarea S(n) S1 is identified as indicated at a block 602 and n is set to 1 as indicated at a block 604. A scan loop for the subarea S1 is performed by the microprocessor 24 located within the subarea S1 or identified from predetermined broadcast map data by the central computer 14 as indicated by a block 606. Each transmitting frequency is identified as indicated at a block 608 and the signal-to-noise signal is threshold compared as indicated at a block 610. When the detected or calculated signal-to-noise signal is greater than an acceptable threshold value T, then the transmitting frequency and transmitter station identification is stored for the subarea S1 as indicated at block 612. Otherwise, when the detected or calculated signal-to-noise signal is less than the acceptable threshold value T or after storing the subarea transmitter data at block 612, then next higher frequencies are sequentially tuned as indicated at block 616 and the sequential steps are repeated until the upper limit of the frequency band is identified at a decision 614. Then n is incremented as indicated at a block 618 and the sequential steps are repeated for a next subarea within the test area.

What is claimed and desired to be secured by Letters Patent of the United States is:

1. Apparatus for determining a particular transmitting station from which program signals are received and translated by a monitored receiver within a test area comprising:

means for storing a transmitter characteristic table; said transmitter characteristic table including a corresponding transmitting station identification stored with a predefined subarea of a plurality of predefined subareas within the test area for each predetermined tuned frequency of the monitored receiver;

means for identifying a tuned frequency of the monitored receiver;

means responsive to both an identified tuned frequency of the monitored receiver and said stored transmitter characteristic table for identifying the particular transmitting station corresponding to said identified tuned frequency; and means for storing data corresponding to the identified transmitting station.

2. Apparatus as recited in claim 1 further comprising: means responsive to an unidentified transmitting station corresponding to a particular identified tuned frequency for storing data corresponding to said particular identified tuned frequency.

3. Apparatus as recited in claim 2 further comprising: a central computer for receiving said stored identified transmitting station data and said particular identified tuned frequency data and said central computer including means for updating said transmitter characteristic table.

4. Apparatus as recited in claim 1 wherein said particular transmitting station identifying means includes means for identifying each stored transmitting station identification corresponding to said identified tuned frequency;

means responsive to a plurality of the identified stored transmitting station identifications for identifying a particular predefined subarea of the monitored receiver; and means responsive to said identified particular predefined subarea for identifying the particular transmitting station corresponding to said identified tuned frequency.

5. Apparatus as recited in claim 4 wherein said particular predefined subarea identifying means includes tuning means responsive to said stored transmitter characteristic table for tuning to at least one selected frequency within one of said plurality of predefined subareas;

means responsive to said tuning means for detecting a signal-to-noise value; and means responsive to said signal-to-noise detecting means for comparing said detected signal-to-noise value with a threshold value to identify said particular predefined subarea.

6. Apparatus as recited in claim 1 wherein said means for storing the transmitter characteristic table and the means for storing identified transmitting station data include a mailable memory cartridge.

7. Apparatus as recited in claim 6 wherein said mailable memory cartridge includes a random access memory (RAM).

8. Apparatus as recited in claim 6 wherein said mailable memory cartridge includes a real time clock.

9. Apparatus as recited in claim 8 wherein the stored identified transmitting station data includes date and time data.

10. Apparatus as recited in claim 6 wherein said mailable memory cartridge stores identification data to identify the apparatus.

11. Apparatus as recited in claim 1 wherein said means for identifying the tuned frequency of the monitored receiver includes means for detecting a local oscillator signal of the monitored receiver.

12. Apparatus as recited in claim 11 wherein said means for identifying the tuned frequency of the monitored receiver further includes;

frequency synthesized receiver means for tuning to synthesized program signals, said synthesized program signals being essentially the same as the program signals which are received and translated by the monitored receiver;

correlation means for receiving signals of the monitored receiver and said frequency synthesized receiver means and for computing a crosscorrelation signal of said program signals received and translated by the monitored receiver and said synthesized program signals of said frequency synthesized receiver means; and means for comparing said computed crosscorrelation signal with a threshold value to determine a match between a tuned frequency of the monitored receiver and said frequency synthesized receiver means.

13. Apparatus as recited in claim 12 further includes means for identifying a last tuned frequency and control means for first sequentially scanning said last identified tuned frequency.

14. Apparatus as recited in claim 12 further includes means for identifying a most tuned frequency and control means for first sequentially scanning said identified most tuned frequency.

15. Apparatus as recited in claim 12 wherein the program signals of the monitored receiver and of said frequency synthesized receiver means are audio signals.

16. Apparatus as recited in claim 12 further including means for identifying the use of an alternative signal source responsive to no determined match by said means for comparing said computed crosscorrelation signal with said threshold value.

17. Apparatus as recited in claim 12 further including means for identifying the use of an alternative signal source responsive to a detected absence of said local oscillator signal of the monitored receiver.

18. A method for determining a particular transmitting station from which program signals are received and translated by a monitored receiver within a test area comprising the steps of:

storing a transmitter characteristic table; said transmitter characteristic table including a corresponding transmitting station identification stored with a predefined subarea of a plurality of predefined subareas within the test area for each predetermined tuned frequency of the monitored receiver;

identifying a tuned frequency of the monitored receiver; and identifying the particular transmitting station corresponding to said identified tuned frequency in response to the identified tuned frequency of the monitored receiver and to said stored transmitter characteristic table.

19. A method as recited in claim 18 further comprising the step of storing data corresponding to the identified transmitting station, said data including time of occurrence data.

20. Apparatus for determining a particular transmitting station from which program signals are received and translated by a monitored received within a test area comprising:

RAM/clock cartridge means for storing a transmitter characteristic table; said transmitter characteristic table including a corresponding transmitting station identification stored with a predefined subarea of a plurality of predefined subareas within the test area for each predetermined tuned frequency of the monitored receiver;

local oscillator detection means for identifying a tuned frequency of the monitored receiver;

means responsive to both the identified tuned frequency of the monitored receiver and said stored transmitter characteristic table for identifying the particular transmitting station corresponding to said identified tuned frequency; and said RAM/clock cartridge means for time-stamping and storing data corresponding to said identified particular transmitting station.

* * * * *